March 24, 1953     K. E. PERSSON     2,632,363
ADJUSTABLE REARVIEW MIRROR
Filed March 23, 1951
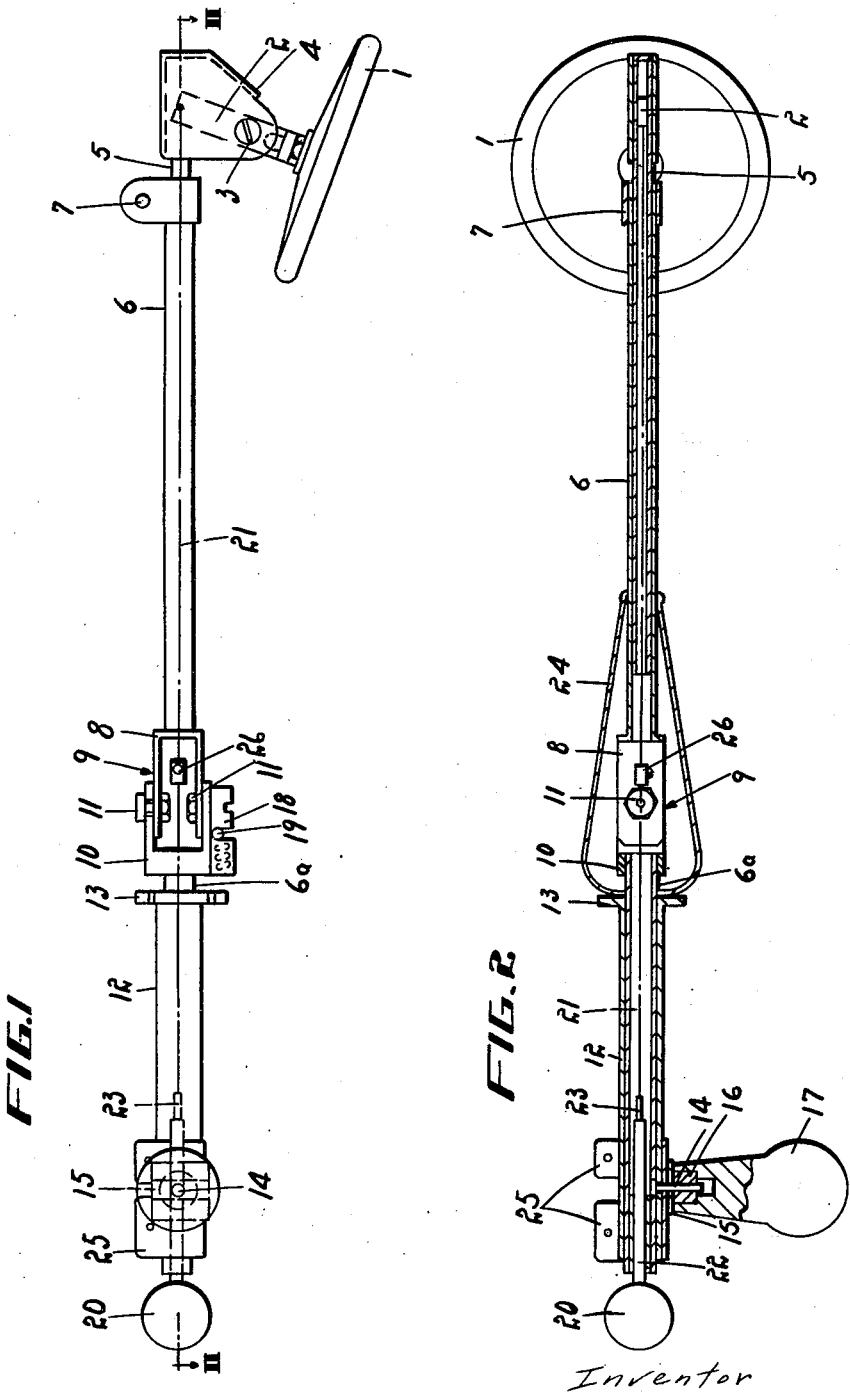
Inventor
Karl E. Persson Patented Mar. 24, 1953

2,632,363

UNITED STATES PATENT OFFICE 2,632,363

ADJUSTABLE REARVIEW MIRROR

Karl E. Persson, Roda, Rodasel, Sweden

Application March 23, 1951, Serial No. 217,184
In Sweden March 27, 1950

3 Claims. (Cl. 88—93)

This invention relates to rear view mirrors and more specifically to such outside rear view mirrors, preferably for freight motor vehicles, which are adjustable into a desired position of use from within the operator's cabin.

Hitherto known outside rear view mirrors for freight motor vehicles involve the disadvantage that the rear view is often obstructed by bulky load on the load platform so that the vehicle operator is completely unaware of any traffic coming from behind. Therefore, there is extensive need for a rear view mirror having a supporting arm of, or extensible to, such a length that the rear view when using the same cannot be obstructed. A supporting arm of such a great length, however, might be damaged when steering the vehicle through narrow passages which drawback, however, might be avoided by making the mirror supporting arm of adjustable length or collapsible against the vehicle body, or both. In order to cause such a mirror to be conveniently adjusted into its proper position of use after having been extended and/or folded out, the mirror should be adjustable both vertically and horizontally by the operator from within the cabin where the field of view offered by the mirror can be checked in the course of the adjustment.

The invention has for its object to provide an adjustable rear view mirror which fulfills all the requirements above referred to.

For the purpose indicated, a rear view mirror according to this invention is mainly characterized by the combined features that the mirror proper is mounted on a bracket projecting radially outward from the outer end of a tubular arm in such a manner that it is angularly adjustable in a plane parallel with the longitudinal axis of said arm, further that said tubular mirror arm is mounted at its opposite end portion in a journal sleeve having at its outer end a flange or the like for permanently mounting the device on the vehicle body wall, and that said mirror arm is provided adjacent its last-mentioned end with an operating member projecting radially outward through a peripheral slot in said journal sleeve, by means of which member said arm is rotatable with frictional resistance for adjusting said mirror in a radial plane relative to said mirror arm, and further that the inner end of a shank member frictionally displaceably mounted in the inner end portion of said mirror arm is, by means of a flexible element, connected with the radially inner end of a lever rigidly mounted on said mirror and pivotally connected with said bracket in order to provide for the adjustment of said mirror in said first-mentioned plane, and that said mirror arm is provided, adjacent the outer end of said journal sleeve on the side thereof remote from its inner end, with a joint which enables the rear view mirror to be collapsed against the vehicle body when in situ.

One specific embodiment of the invention will now be described by way of example, reference being had to the accompanying drawing in which:

Fig. 1 is a side-view of the rear view mirror according to said embodiment, whereas Fig. 2 is a longitudinal section thereof according to line II—II in Fig. 1.

Referring to the drawings, the mirror proper 1 is provided on its back with a rearwardly extending lever 2 which later is, at a point situated nearer to the mirror 1 than to its free outer end, by means of a pivot pin 3 pivotally mounted in a bracket 4 which is rigidly mounted on the outer end of a tubular member 5 and projects radially outward therefrom.

The tubular member 5 is displaceably mounted in telescopic fashion in a second tube 6 the outer end of which is preferably provided with a pair of longitudinally extending compression slits, said end being surrounded by a clamp 7 by means of which the outer tube 6 may be rigidly clamped to the inner tube 5 in order to set the latter to a desired lengthwise position. Thus, the latter arrangement enables a lengthening and shortening of the mirror arm 5, 6. The inner end of tube 6 carries one U-shaped member 8 of a joint 9 the other U-shaped member of which 10 is carried by the outer end of an extension portion 6a of the outer tube 6. The two U-shaped members of said joint 9 are, as usual, interconnected by a pair of pivot pins 11, and one pivot pin of one U-shaped member 8 is rigidly attached to one of its legs and provided with a cylindrical head 18 having in its periphery a shallow recess which can be engaged by a spring-loaded locking pin or the like 19 on the corresponding leg of the other U-shaped member 10 whereby a snap-lock is obtained which maintains the outer portion of the mirror arm in the straight position shown in the drawing, and which at the same time enables the arm to be collapsed against the vehicle body. This arrangement could, of course, be devised in several different ways in order to reach the same end.

The inner portion 6a of the mirror arm is mounted in a journal sleeve 12 which is intended to be inserted through a hole made for the purpose in the body wall or a door of the vehicle and to be secured thereto by means of a mounting flange 13 provided on the outer end of sleeve 12. Adjacent to its inner end, said sleeve 12 is provided with a peripherally extending slot through which a pin or the like secured to the tube portion 6a passes radially outward. The pin 14 carries a resilient plate 15 which engages a portion of the outside of the sleeve 12, and radially outside of said plate an outwardly and inwardly threaded nut 16 is screwed onto said pin 14, an operating member in the form of a knob 17 being in its turn screwed onto said nut 16. The knob 17 is intended to be tightened against plate 15 in order to clamp the latter against sleeve 12 or against the periphery of a pair of clamps 25 disposed as shown, in order to cause the rotation of tube portion 6a to occur with a certain frictional resistance when adjustment of the mirror in said radial plane takes place.

In order to enable adjustment of the mirror 1 in said axial plane, the radially inner end of said lever 2 is connected with a second operating member in the form of a knob 20 by means of a comparatively stiff although flexible metal wire 21 capable of sliding longitudinally through the inner tube portions 5 and 6a. Knob 20 is mounted on a shank 22 which is frictionally and displaceably disposed in the inner end portion of said inner tube portion 6a. In the outer end of said shank 22 is inserted a screw or the like 23 to the outer end of which the corresponding end of said metal wire 21 is secured. The wire 21 runs through the inner tube portions 6a, 6 and forms together therewith a Bowden-cable resembling arrangement, and thus it passes also through the joint 9. In order to enable extension of the mirror arm 5, 6 by displacement of tube 5 longitudinally a suitable distance relatively to tube 6, the wire 21 will have to be extensible. For this purpose, the wire 21 consists of two parts which overlap considerably at the joint 9 where they are interconnected by a wire clamp 26 which is intended to be loosened before extraction of tube 5 being undertaken, and to be tightened again after the lengthening or shortening of the mirror arm having been carried out.

As shown in Fig. 2, a protective flexible sheath 24 is preferably removably attached about the joint in order to prevent dust and water from penetrating into the joint and tubes.

It will be understood that the invention is not restricted to the embodiment described and illustrated but is susceptible of various modifications without departing from its intended scope as defined by the appended claims.

What I claim is:
1. An adjustable rear view mirror for automobiles comprising a reflector, two tubular members displaceably interrelated in telescopic fashion and forming together a tubular arm, said tubular arm carrying said reflector at one end thereof, a radially projecting bracket for carrying said reflector on said arm, lever means connecting said reflector with said bracket so as to be pivotable in a plane parallel to the longitudinal axis of said arm, a journal sleeve surrounding said tubular arm, said tubular arm being rotatable in said sleeve, mounting means on said sleeve for attaching said arm to the body wall of said automobile with said sleeve passing through an opening in said wall, a handle near the end of said arm opposite to its reflector-carrying end, said arm being, by operation of said handle, rotatable to adjust said reflector in a radial plane relative to said arm, a shank member frictionally displaceably engaged in said handle-carrying end of said arm, a grip carried on the outer end of said shank member for displacing the latter longitudinally of said arm, a flexible connecting element passing through the interior of said arm and connecting the inner end of said shank member with the radially inner end of said lever means for said reflector, a joint provided in said arm adjacent the outer end of said journal sleeve on the side thereof remote from said handle-carrying end of said arm, whereby the outer portion of said arm with said reflector is collapsible against said body wall, and means at said joint for adjusting the length of said flexible connecting element in accordance with any adjustment of the length of said tubular arm.

2. An adjustable rear view mirror as claimed in claim 1, and including a comparatively stiff metal wire guidable in said tubular arm and constituting said flexible connecting element, said wire being in two parts which substantially overlap at said joint, and clamping means interconnecting said two wire parts at said joint.

3. An adjustable rear vew mirror as claimed in claim 1, and wherein a flexible sheath removably surrounds said joint for protecting the same.

KARL E. PERSSON.

REFERENCES CITED

The following references are of record in the file of this patent:

UNITED STATES PATENTS

| Number | Name | Date |
| --- | --- | --- |
| 1,823,636 | Winkler et al. | Sept. 15, 1931 |
| 2,260,597 | Beattie | Oct. 28, 1941 |
| 2,315,260 | Lancaster | Mar. 30, 1943 |
| 2,330,444 | Park | Sept. 28, 1943 |
| 2,341,208 | Clark et al. | Feb. 8, 1944 |
| 2,483,289 | Martin | Sept. 27, 1949 |